April 8, 1969 A. KLEM 3,437,749

BEAM CURRENT CONTROL CIRCUIT FOR TELEVISION CAMERA PICK-UP TUBE

Filed Oct. 4, 1965

ADRIANUS KLEM
INVENTOR
BY Arthur B. Colvin
ATTORNEY

United States Patent Office 3,437,749

Patented Apr. 8, 1969

3,437,749

BEAM CURRENT CONTROL CIRCUIT FOR TELEVISION CAMERA PICK-UP TUBE

Adrianus Klem, Delft, Netherlands, assignor to N.V. Optische Industrie "De Oude Delft," Delft, Netherlands, a corporation of the Netherlands Filed Oct. 4, 1965, Ser. No. 492,415
Claims priority, application Netherlands, Oct. 6, 1964, 6411589
Int. Cl. H04n 5/38
U.S. Cl. 178—7.2 2 Claims

ABSTRACT OF THE DISCLOSURE

A beam current control system for an image orthicon television camera which automatically controls the scanning beam intensity in response to variations in the output signal. The system derives its control signal from a comparison circuit comparing two unidirectional voltages, one proportional to the video signal and the other proportional to the high frequency noise level in the output signal, and tends to maintain a constant ratio between the two voltages.

The invention relates to a beam current control system for a television camera having a pick-up tube of the type in which a target is scanned by a beam of low speed electrons and in which the video signal is derived from the beam returning from the target after having been modulated in intensity by the charge pattern stored in the target in accordance with the image contents. With television pick-up tubes of the type indicated, e.g. the image orthicon with electron multiplier, it is essential for optimum image quality that the current intensity of the scanning beam be well adapted to the electric charge that has been stored in the target in the period between successive scannings. As the theoretic criterion for the optimum adjustment of the beam current intensity it is generally adopted that the highest charge found in any elemental area of the target (which corresponds to the highest light in the image) is just cancelled by the passing scanning beam. In case the beam intensity is lower the highest lights will be incompletely discharged and the contrasts will be spoiled (peeling). If the beam intensity exceeds the optimum value the return beam will obviously be less deeply modulated by the video signal than would be possible. The excess of beam current contributes to the noise in the output signal, thus deteriorating the signal-to-noise ratio.

Accordingly, each variation of the image contents whereby the highest level of illumination is changed, should be accompanied by a corresponding adjustment of the beam intensity. For many practical applications it is customary to provide the camera with manual control means enabling the camera operator to vary the potential at the control grid of the electron gun at will, the visual appearance of the picture on a monitor screen being used as a guide. In certain fields, however, such as in medical X-ray television, automatic controls for the beam current intensity have been devised, not only to relieve the medical personnel of this work but also because, especially in radiological practice, sharp variations in image intensity occur very frequently. A further reason is that, in the interest of dose reduction, the average level of illumination of the photocathode will be limited as much as possible so that signal-to-noise ratios are necessarily relatively poor and any further deterioration thereof should be avoided by all means available.

There have been a number of proposals, prior to this invention, to effectuate the automatic control of beam intensity in response to the output of the tube. According to one of the more advanced proposals the peak value of the video signal is compared to the intensity of the D.C.-component in the output signal of the tube. This system is based on the assumption that the ratio between these two values should have a certain constant value for optimum image quality, which value is maintained by varying the beam current intensity. This system is inherently relatively slow since the intensity of the D.C.-component that is used as a comparison quantity is sufficiently defined only when taken over a relatively long time interval. Moreover, the system necessitates relatively complicated circuitry and is not easily stabilized for a large range of operative conditions.

By the present invention a novel automatic beam control circuit is proposed that adopts a different criterion for the adjustment of scanning beam intensity to the prevailing light level. In the system of the invention means are provided to derive two unidirectional voltages from the output signal of the pick-up tube, i.e. one potential that is determined by the value of the video signal and a further potential that is solely determined by the noise level in the output signal. These two signals are compared to each other and, if the ratio between them deviates from a predetermined value, the potential at the control electrode for the beam current is varied so as to restore the predetermined ratio.

Thus, in the control circuit of the invention the intensity of the video signal is directly compared to the noise accompanying such signal and deviations of the signal-to-noise ratio from the desired value are automatically cancelled by adjusting the scanning beam current. The selection of the value of the signal-to-noise ratio which the system seeks to maintain can, within certain limits, be left to the operator of the camera, dependent on the available light level and the personal views of the operator. In this way a control system is obtained permitting a precise adjustment of the beam intensity for optimum image quality within the possibilities set by the selected signal-to-noise ratio.

It may be observed that in the prior system discussed herebefore the intensity of the D.C.-component in the output signal of the tube is determined, inter alia, by the charges stored in the target, thus by the average illumination of the photocathode. Consequently, the comparison voltage derived from this D.C.-component cannot be a true measure for the fluctuation noise introduced by the scanning beam and, hence, the prior system cannot result in a constant signal-to-noise ratio.

The unidirectional voltage representing the noise level in the output signal is derived by feeding the output signal of the pick-up tube to a filter having a band-pass lying above the frequency band occupied by the effective video signal, and then amplifying and detecting the resulting noise signal. Preferably, a very narrow pass band at a large distance (some mc./s.) above the effective video band is selected, since in that case no noticeable influence is encountered of the blanking signals and of spurious signals during blanking periods such as induced by the deflection coils. Preferably a piezo-electric crystal filter is used because of its very narrow pass band, its simplicity and its stability.

In an advantageous embodiment of the invention the means for deriving and comparing the two unidirectional voltages and for varying the beam current so as to maintain a constant ratio between the two, are arranged in such a manner that the time lag between the occurrence of a deviation from the predetermined ratio and the restoration of the constant ratio is very short in comparison with the duration of one field of the television picture. This means that the intensity of the beam current must not necessarily be determined by the maximum or by an average illumination level, corresponding to the peak or to an average value of the video signal, respectively. That practice, which is a characteristic feature of the inherently slow automatic beam current control systems hitherto available, entails the disadvantage that in pictures having a large range of contrasts the dark portions of the image will exhibit a strong noise. Contrary to this, the control system according to the present invention enables the scanning beam intensity to follow the video signal in the sense of a constant signal-to-noise ratio at a time lag which is very short in comparison to the field period. If desired, the integration time of the means deriving the unidirectional voltages representative of the video signal and the noise level, respectively, can even be made so short as to result in a practically instantaneous adaption of the beam current to the local level of illumination, whereby a substantially constant signal-to-noise ratio is maintained throughout the picture. In this manner an essential disadvantage of television pick-up tubes of the type discussed here, i.e. the relative poor signal-to-noise ratio especially with high contrast pictures, is eliminated to a high degree.

It may be noted in this connection that, in the control system of the present invention, the comparison signal representing the noise is in the form of an A.C. signal of narrow band width and of high frequency compared with the video signal. Such signal obviously is suited for immediate amplification and detection, thus enabling the desired quick response to be achieved easily.

It may be observed that, prior to the present invention, comparison of an information carrying signal to a noise signal taken from a frequency band above the useful band width has been used in audio frequency signalling systems in order to discriminate between signals received containing predominant useful information and signals in which noise oscillations are predominant and which should accordingly be suppressed by a reduction of the amplifier power output. These known systems used no feed-back, however, to maintain a selected constant signal-to-noise ratio of an incoming signal.

An embodiment of the invention will be described in detail hereinafter, reference being had to the drawing in which.

Figures 1, 2:
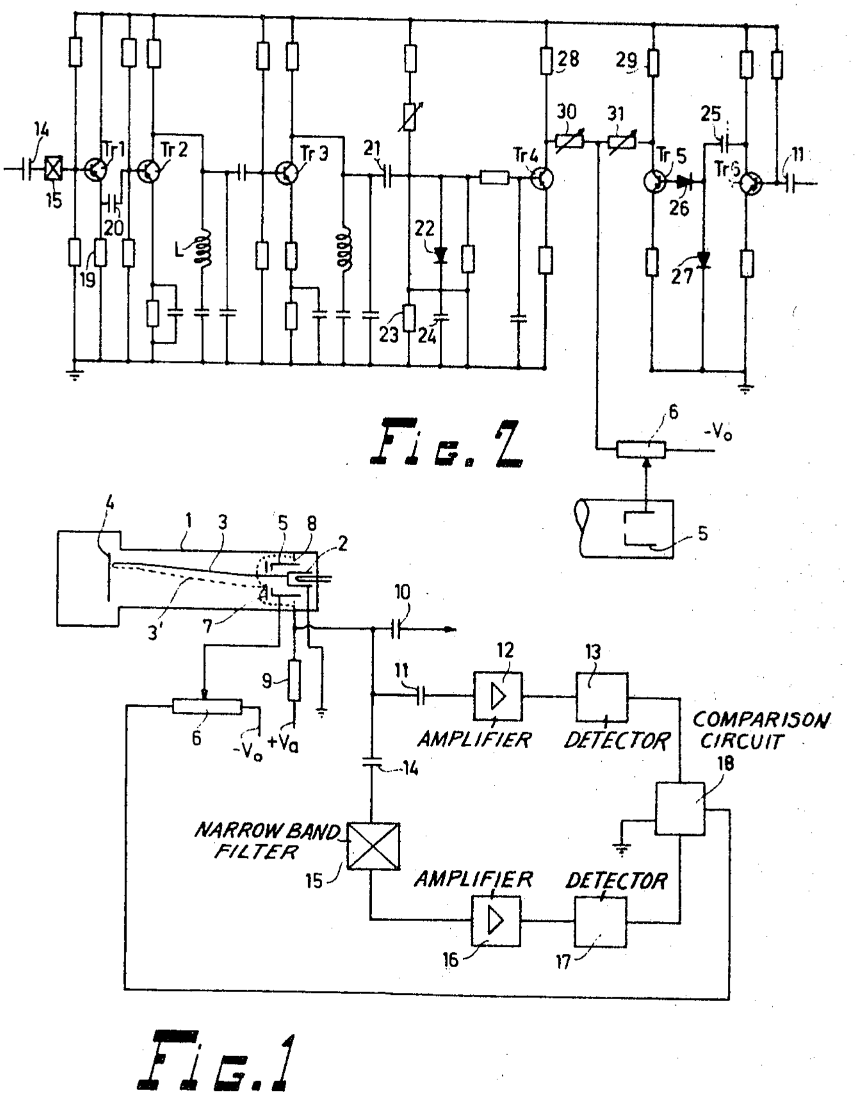
FIG. 1 is a block diagram of the control circuit.
FIG. 2 shows details of a possible form of the control circuit.

In FIG. 1 item 1 is a television pick-up tube, e.g. an image-orthicon, parts of which that are not essential for a good understanding of the present invention have been omitted. The cathode 2 of the electron gun which provides the focused electron beam 3 for scanning the target 4, is connected to earth potential. The control electrode 5 which has an aperture for the passage of the beam receives a negative bias potential from the adjustable potentiometer 6, one side of which is connected to a comparison circuit 18 and the other side of which lies at a source of fixed potential $-V_0$.

The modulated return beam 3' strikes the first dynode 7 of an electron multiplier of which only the anode 8 is shown further. Anode 8, through the signal resistor 9 is connected to a source of high positive potential $+V_a$. The video signal voltage developed across the resistor 9 is fed to a conventional video amplifier (not shown) via a capacitor 10 to eliminate the D.C.-component in the output signal.

Furthermore, two unidirectional voltages are derived from the tube output, one of which is proportional to the value of the video component itself whereas the other is independent thereof but is proportional to the noise level in the output. The first mentioned voltage is obtained by means of a circuit consisting of a capacitor 11, an amplifier 12 and a detector 13. The detector has to detect the amplified video signal so that a unidirectional voltage representing the video signal becomes available.

The band width of the amplifier 12 and the characteristics of the detector 13 determine the relationship between this signal and the video signal itself. In case the band width of the amplifier 12 is e.g. 5 mc./s. and the detector circuit 13 has a small time constant in accordance with that high frequency then the unidirectional potential derived will follow the fluctuations in the video signal substantially unattenuated. On the contrary, with a smaller band width or a slower detection a certain integration of the video signal will naturally result. Thus, these details may be determined in each case in accordance with the speed of response deemed desirable.

The voltage representing the noise level is derived by feeding the tube output through capacitor 14 to a conventional piezo-electric crystal filter 15 which separates from the signal the noise oscillations comprised in a narrow frequency band, and by applying the same after amplification and detection by an amplifier 16 and a detector 17, respectively, to the comparing cricuit 18. The pass band of the crystal filter may have a width of e.g. 20 cycles per second and may be centered e.g. at 10 mc./s., i.e. far above the frequency band of the effective video information, so that the voltage derived is indeed solely determined by the noise level. It may be observed that with pick-up tubes of the type discussed herein the noise amplitude at the high frequency employed is a reliable measure for the noise level in the video frequency region too.

The comparison circuit 18 compares the two unidirectional voltages to each other and develops a positive or negative control voltage if any deviation from the selected ratio between the two signals should occur. The control voltage is applied in series with the bias voltage across potentiometer 6 so as to vary the potential at the control electrode 5 in such a manner that the set ratio tends to be restored.

Details of a possible form of the circuit shown in FIG. 1 can be seen in FIG. 2. Herein, at the extreme left, the capacitor 14 and the crystal filter 15 of FIG. 1 are shown, whereas at the extreme right the capacitor 11 will be seen. The output signal of filter 15 is injected as a current into the base of transistor Tr1. This transistor is connected as emitter follower (earthed collector) so as to prevent the crystal filter from being heavily loaded by the first amplifier stage. The signal is coupled out at the emitter resistor 19 through a capacitor 20 and then applied to the base of the next transistor Tr2 which by means of the coil L is made to operate as a peaked amplifier in the 10 mc./s. region. The resulting signal is further amplified in a similar amplifying stage by transistor Tr3. The signal now obtained is applied through capacitor 21 to the base of transistor Tr4 after having been rectified by diode 22. Transistor Tr4 forms one-half of a bridge circuit in which the two unidirectional voltages used for the control are compared to each other. The R-C network 23, 24 determines the rate at which the comparison signal follows the noise signal. Thus, this network may be dimensioned so as to secure a desired response speed.

The video signal is applied to capacitor 11, amplified by transistor Tr6 and through capacitor 25 and diodes 26, 27 injected as a unidirectional signal into the base of transistor Tr5 forming the other half of the bridge circuit. An increase of the current in transistor Tr4 causes a higher voltage drop to be developed across resistor 28. Similarly, an increase of the current in transistor Tr5 will result in a higher voltage drop across resistor 29. Variable resistors 30 and 31 are connected in series between the collectors of Tr4 and Tr5. The common terminal of resistors 30 and 31 is connected to potentiometer 6 providing the potential for the control electrode 5 of the pick-up tube.

A desired signal-to-noise ratio may be selected under visual control on a monitor picture by varying the resistors 30 and 31 and the potentiometer 6. After that, the circuit maintains the selected signal-to-noise ratio automatically by changing the potential of control electrode 5 in response to variations of the potentials at the collectors of Tr4 and Tr5 in such a manner that the equilibrium of the bridge circuit is restored.

What I claim is:

1. A beam current control system for a television camera having a pick-up tube of the type in which a target is scanned by a beam of low speed electrons and in which the video signal is derived from the beam returning from the target after having been modulated in intensity by the charge pattern stored in the target in accordance with the image contents, said circuit comprising means to automatically control the current intensity of the scanning beam in response to the output signal of the tube, characterized in that the said means comprises means to derive from the output signal of the pick-up tube two unidirectional voltages, i.e. a first voltage which is determined by the value of the video signal, and a second voltage which is solely determined by the noise level in the output signal, means to compare the two unidirectional voltages to each other and means to vary, in case of deviations from a predetermined ratio between the two voltages, the potential of the control electrode for the beam current so as to restore the said predetermined ratio.

2. A circuit as claimed in claim 1, wherein the means for deriving the second unidirectional voltage from the output signal comprises a filter having a pass band lying above the frequency region occupied by the effective video signal, and means to amplify and detect the output signal of said filter.

References Cited

UNITED STATES PATENTS

| | | | |
|---|---|---|---|
| 2,534,627 | 12/1950 | Schade | 178—7.2 |
| 2,961,574 | 11/1960 | Brenholdt | 315—11 |
| 3,316,349 | 4/1967 | Loughlin | 178—7.2 |

ROBERT L. GRIFFIN, *Primary Examiner.*

ROBERT L. RICHARDSON, *Assistant Examiner.*